United States Patent Office 3,484,356
Patented Dec. 16, 1969

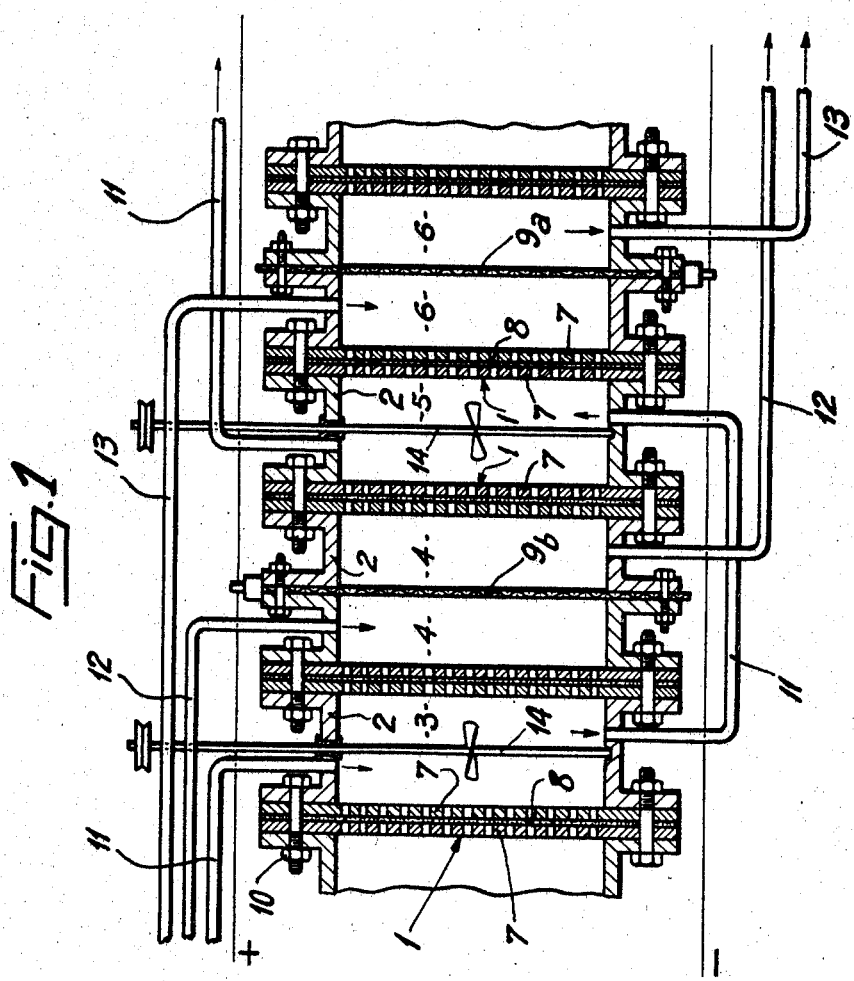

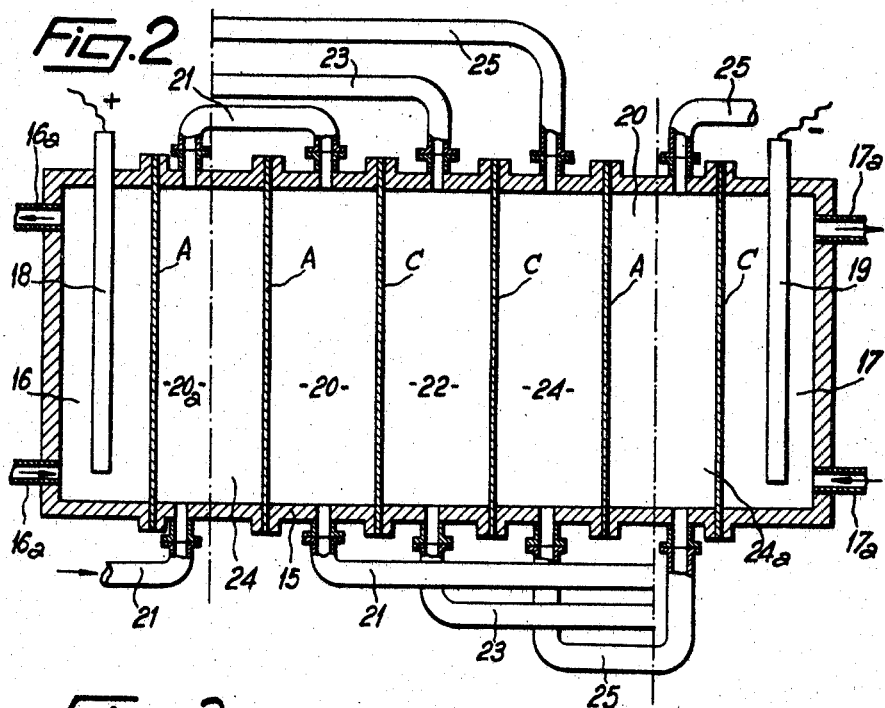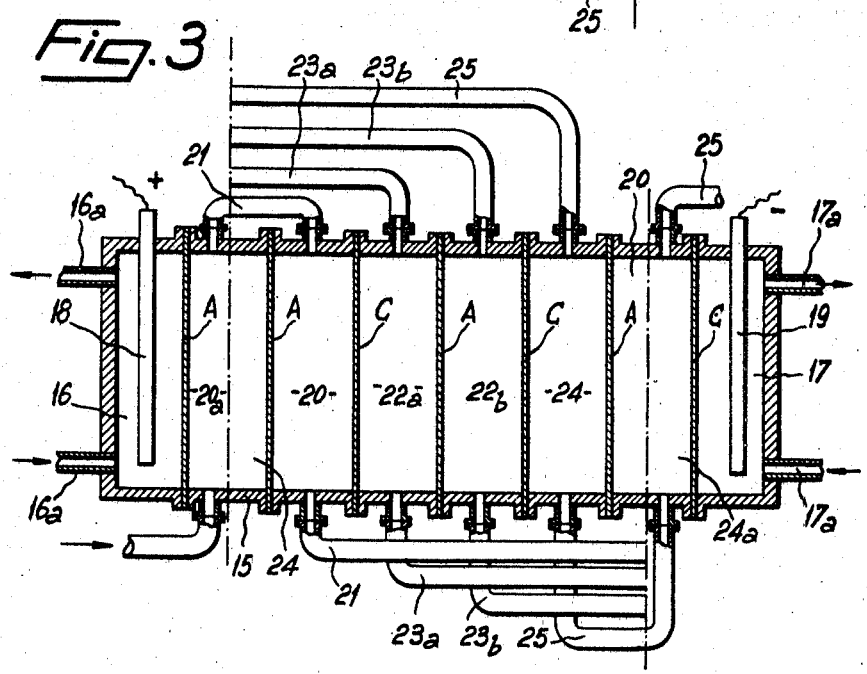

3,484,356
PROCESS AND APPARATUS FOR THE PRODUCTION OF CHEESE PASTES AND MILK CURDS
Marie Pierre Goujard, Neuilly-sur-Seine, France, assignor to Compagnie Gervais Danone, Paris, France, a company of France
Filed June 20, 1966, Ser. No. 559,006
Claims priority, application France, July 1, 1965, 23,154; May 25, 1966, 62,911
Int. Cl. A01j 25/00
U.S. Cl. 204—180                                    20 Claims

ABSTRACT OF THE DISCLOSURE

Cheese pastes and milk curds are produced continuously by subjecting a stream of milk to acidifying electrodialysis to lower the pH of said stream to less than the isoelectric point of the casein therein and separating the thereby produced curd from the whey. Apparatus for carrying out this treatment is characterized by a plurality of cells, and having a series of four compartments, the first and third of which are connected for flow of milk being treated serially therethrough, a pair of electrodes for dialysis, one of which is disposed in the second compartment and the second being of different polarity and disposed in the fourth compartment, with independent means for introducing a dialyzing liquid into each of the second and fourth compartments.

---

It is well known that cheese pastes are generally made by using rennet to produce an enzyme action on milk casein, followed by coagulation of the modified casein, which is brought about both by a supply of ionic calicum to the protein complex and by acidification of the medium by the presence of selected strains of lactic ferments which are also introduced to accelerate the coagulation process, the said ferments also giving the pastes the required organoleptic properties.

This process can be divided into distinct stages, since the enzyme action can be carried out independently at low temperature, followed by coagulation which can be initiated rapidly at higher temperature, although this entails the risk of a modification of the grain.

The various characteristics of these operations make it difficult to perfect a really continuous process which is unsuitable, inter alia, for renneting and draining, and they entail various other disadvantages.

The main ones are due to the need to modify the amounts of rennet according to the quality of the treated milk, packing problems and casein losses due to the syneretic action of the rennet which continues after draining, and difficulties in obtaining a constant final acidity, which depends on the acidifying power of the lactic bacteria.

In addition to these disadvantages, present-day production processes limit the resulting products to a few types of paste.

The present invention relates to a new process for the production of cheese pastes and milk curds which avoids the disadvantages mentioned above. According to the invention such a process is characterised in that milk is subjected to a acidifying electrodialysis until its acidity reaches a pH value lower than that which corresponds to the isoelectric point of the casein, after which the curd obtained is separated from the whey.

The object of the process according to the invention is different from those of electrodialysis processes which were hitherto applied only to cheesemaking whey and which were intended simply for demineralisation of such whey.

The process may be carried out in an electrodialysis apparatus comprising a compartment bounded by two dialysis membranes, the milk remaining static or flowing in such compartment, and two compartments disposed on either side of the membranes and containing the two electrodes and water, the rates of flow of which can be selectively adjusted separately.

Within certain limits compatible with the speed of electrodialysis, such speed depending mainly on the electrical and geometrical parameters of the system, the sign of the algebraic value of the difference between these rates of flow of water determines, through the agency of different actions on the transfer, elimination or conversion of the types of ion involved, a variation of the pH of the treated milk, which will have an increasing acidity or alkalinity depending upon whether the sign is positive for the cathode compartment or for the anode compartment respectively.

By suitable adjustment of the various factors involved in electrodialysis, and more particularly by feeding the cathode compartment with a greater flow of water then the anode compartment while the two rates of flow remain within certain limits compatible with the other imposed conditions, the electrical current flowing will result mainly in a progressive increase of the acidity of the milk, this being an important feature of the invention, the milk then coagulating when its pH reaches a zone of values corresponding to the various isoelectric points of the proteins present. It should be pointed out that this acidity does not result from the addition of any reagent to the milk.

It should also be noted that this electrodialysis process is also suitable—by controlling the value of the difference between the rates of flow of water feeding the anode and cathode compartments—for producing demineralisation within a specific period, accompanied by a greater or lesser variation in acidity within the same time. Of course the degree of independence between these two factors can be controlled by the use of selective membranes or by feeding the electrode-containing compartments with water of varying alkalinity or acidity.

This new feature enables the osmotic and chemical conditions of the medium to be controlled to control the texture of the paste.

The water flows generally allow ordinary temperature to be used, without any variation during treatment.

When the milk has been brought to the required pH, for example a pH of 4.5, it is fed to a centrifuge to separate the curd from the whey. Depending upon the degree of centrifugation, the resulting paste will be of varying consistency so that various types of paste can be produced from one and the same apparatus, and this is another important result. This result is due to the absence of syneresis in the resulting curd, and this forms another important advantage of the process.

Finally, as a result of the milk coagulating principle applied, the electrodialysis system described or any suitable combination of identical electrodialysis cells equipped with the elements required for adequate flow of the fluids and control of the rates of flow, can be operated continuously, the rates of flow depending upon the acidity and degree of demineralisation at any time.

In short, the new milk coagulating process according to the invention comprises the use of electrodialysis adapted to operate continuously, wherein the difference between the rates of flow of water in the anode and cathode compartments is controlled both as regards absolute value and sign so that progressive acidity of the milk is obtained without any reagent, so that the milk coagulates without any prior need for renneting.

The milk used in the process according to the invention may be skimmed milk, whole milk, high fat content milks or dry extracts, and condensed or evaporated milk. The milk may be prefermented beforehand to give the paste an organoleptic character characteristic of the bacteria used, or may be treated simply after pasteurisation to give a tasteless paste to which any required flavour can be added subsequently. The fermentation applied may also be carried out after electrodialysis and before centrifugation.

In the case of prefermentation, the use of ferments adapted to electrical current has proved preferable.

In addition to the above-mentioned advantages of providing a syneresis-free curd, pastes of varying consistencies, and demineralisation of the milk independently of the increase in acidity, the process according to the invention also gives the possibility of obtaining a constant and predetermined final acidity. The nature of the acidity at the end of the electrodialysis gives the curd advantageous bacteriostatic properties to ensure better keeping properties than is possible with conventional pastes, because the physico-chemical modifications of the medium do not allow subsequent uncontrolled growth of the controlled microbial flora, or any contamination.

According to an advantageous embodiment of the invention, selective anionic and cationic membranes are used for the electrodialysis, so that the losses of dialysable non-ionic substances, such as lactose, can be reduced if not eliminted.

The selective membranes also allow operation against the concentration gradient, while non-selective membranes result in dilution of the treated solution.

Also, appropriate application of the membranes enables the milk to be acidified without impoverishing it with respect to cations, the electrodialysis then being effected by using as the anion source either milk, a milk derivative, or preferably a whey from a previous curding operation.

In order that the invention may be more readily understood, the theory of the mechanism involved in milk electrodialysis as proposed according to the invention will now be explained, although the invention is not limited to this particular theory.

As a result of the electrical field, the types of ions which are contained in the milk or which are likely to form therein as a result of displacement of the ionisation equilibria, separate and migrate towards the electrodes.

The ions are more particularly mineral ions, such as $Ca^{++}$, $Mg^{++}$, $Na^+$, $K^+$, $Cl^-$, various phosphate ions, with which we may advantageously include charged colloidal particles, and various organic ions.

In accordance with the operating principle of the apparatus in which the cathode compartment is fed with water in a flow very much greater than the flow of water kept in the anode compartment, the cations move towards the cathode compartment and are discharged on the cathode, and are eliminated together with their products resulting from the reaction with the water.

On the other hand, the anions conveyed to the anode are discharged thereon when they have been able to pass through the membrane.

The resulting radicals which are not or substantially not eliminated, then act on the water to give different acids which are in turn ionised.

Under the action of the electrical field, the protons produced leave the anode compartment and move towards the cathode compartment while the anions remaining captive in the anode compartment are redischarged, react on the water and thus perpetuate the reaction cycle in this compartment.

The proton flux sustained in this way by the anode compartment then modifies the ionisation equilibria and the anion transfer in the milk, and the final result is acidification of the milk by these protons and by the creation of acids derived from the anions present in the milk, so that the proteins coagulate when the pH reaches their isoelectric points.

Electrodialysis carried out in this way and continued after coagulation of the milk would tend towards electrolysis of the water under the conditions imposed by the medium.

It has been found that during the treatment the milk undergoes neither oxidation nor chlorination.

By ordinary dialysis there is a low loss of lactose which can be very much reduced if the electrodialysis time is shortened by a suitable choice of the operating parameters.

It will be apparent that adjustment or control of the rates of flow of the water will enable demineralization and the increase of the milk acidity to be controlled independently. Other expedients may be incorporated, such as the use of selective membranes, or the supply of alkaline or acidic liquids. The development of the electrodialysis also obviously depends on the geometric and electrical conditions of the system.

It will therefore be apparent that any suitable combination of electrodialysis cells of the type hereinbefore described can be used to enlarge the possibilities of the process as regards the amount of milk treated and as regards continuous operation.

The invention will now be described in greater detail by the following non-limitative examples of the process.

Example 1

Milk (1.5 litres) previously pasteurized and inoculated with an association of *Streptococcus lactis* and *Streptococcus diacetilactis* was subjected to electrodialysis for 6 hours (at 18° C.) after inoculation, its pH being 6 (22° D.) and its lactose content 49.5 gm./litre.

The electrodialysis apparatus consisted of a tank of transparent material having the internal dimensions 17 x 15 x 17 cm. and divided into three compartments by two frames edged with rubber gaskets, two regenerated cellulose membranes being retained on the frames, the dimensions of the useful part of the membranes being 9 x 14 cm. The central milk-containing compartment had a spacing of 6.5 cm. between the membranes, and the anode and cathode compartments respectively had membrane-wall spacings of 4.5 cm. and 6 cm.

The central compartment contained a screw agitator (1000 r.p.m.).

The anode was a graphite plate measuring 14 x 9 cm. and the cathode was a stainless steel plate of the same dimensions, both spaced 1 cm. from the membranes.

The anode and cathode compartments were filled with water, but only the cathode compartment was fed with tap water.

The electrodes were connected to a D.C. source delivering 60-volt potential difference.

Under these conditions the pH of the milk reached a value of 4.4 in 2¼ hours (titratable acidity 70° D.), the current being 1.2 amps. No temperature rise was detected.

Centrifugation was then carried out at 4300 r.p.m. for 4 minutes to yield 460 g. of very homogeneous curd having no syneresis.

The contents in relation to the dry extract of this curd in respect of the various constituents as below were: fats—42.3%, Ca+Mg—0.42%, Cl—0.33% and lactose—12.8%.

The separated whey, having a volume of 1.035 litre, titrated 41° D. and contained 1.1 gm./litre of Ca+Mg, 0.73 gm./litre of Cl and 50 gm./litre of lactose.

The above results, particularly in respect of the curd, are equivalent to values conventionally obtained in fresh cheese pastes, the curd being only slightly delactosed and demineralised as compared with conventional products.

Example 2

In this example the apparatus shown partly in FIGURE 1 of the accompanying drawings was used, this figure being a schematic sectional elevation of the apparatus.

The apparatus consisted of circular membrane-supporting discs 1 of a diameter of 15 cm. interposed between stainless steel cylindrical elements 2 with the interposition of rubber gaskets so as to define inter-membrane spaces successively forming a milk-flow compartment 3, an anode compartment 4, another milk-flow compartment 5, and then a cathode compartment 6, these units being repeated six times (twelve milk compartments), and two additional final anode and cathode compartments.

Each milk compartment also contained an agitation system 14 to avoid the formation of clots and render acidification of the mass uniform.

Each membrane disc 1 consisted of two thin polyvinyl chloride plates 7 formed with apertures and clamping between them a regenerated cellulose membrane 8, the periphery of the plates in the shape of a solid ring being formed with the apertures required for assembly bolts 10.

The 5 cm. long cylindrical elements 2 with two apertured connecting flanges 2a were equipped with conduits 11, 12, 13 required for the milk or anode water pulsated by three pumps (not shown). Those of the elements 2 associated with the anode and cathode compartments 4 and 6 consisted of two equal cylindrical parts, with electrically insulating gaskets, enclosing a stainless steel (cathode) or platinum (anode) grid 9a and 9b respectively, the various grids being connected to the 110 volts.

The prefermented milk flow (pH=5.85, lactose content 44 gm./litre) was 0.1 litre/minute and the rates of flow of anode and cathode water were respectively 0.005 and 0.5 litre/minute, so that with a current of 2.1 amps, and after centrifugation, a curd was continuously obtained with the following contents based on dry extract: fats—41%, Ca+Mg—0.57%, Cl—0.28% and lactose—13.5%.

The whey titrated 44° D. and contained 1.16 gm./litre of Ca+Mg, 0.72 gm./litre of Cl, and 48.5 gm./litre of lactose.

The above figures are of course given solely by way of example.

FIGURES 2 and 3 of the accompanying drawings show, by way of example, two further embodiments of electrodialysis apparatus for carrying out the process according to the invention. These two figures are schematic sectional elevations of part of the apparatus.

In the embodiment shown in FIGURE 2, the electrodialysis apparatus comprises a tank 15 formed from segments which abut with the interposition of selective membranes A and C. The membranes A are anionic, i.e. permeable with respect to anions; the membranes C are cationic, i.e. permeable to cations.

The end segments form chambers 16 and 17 which respectively contain an anode 18 and a cathode 19.

The intermediate segments form elementary cells consisting of three compartments bounded by two anionic membranes enclosing two cationic membranes. In the compartments 20 situated between an anionic membrane and a cationic membrane, there is a flow of acid which is supplied and removed by pipes 21. The acid is preferably a strong acid, for example sulphuric or hydrochloric acid, in a concentration of the order of 0.05 to 0.2 N, for example; in the compartments 22 between two cationic membranes there is a flow of the milk to be treated, which flows through the pipes 23; while water or a very dilute aqueous solution flows in the compartments 24, which are served by pipes 25. Homologous compartments are preferably connected by the pipes 21, 23 and 25.

The anode chamber 18 is separated from the first acid compartment 20a by an anionic membrane while the cathode chamber 17 is separated from the last water compartment 24a by a cationic membrane. These chambers contain appropriate solutions which can initially consist of water, which during operation is enriched with ions and which if necessary is kept at a given concentration by means of conduits 16a or 17a.

In operation, the membrane C separating the compartment 22 occupied by the milk from the compartment 20 occupied by acid, stops the milk anions but passes the protons coming from the acid compartment while the milk cations pass into the water compartment 24 so that there is a progressive acidification of the milk.

By suitable adjustment of the various factors involved in electrodialysis, more particularly the nature, concentration and renewal of the liquids feeding the chambers and compartments other than those which contain the milk, i.e. the anode solution contained in chamber 16, the acid solution in compartments 20, the aqueous solution in compartments 24, and the cathode solution in chamber 17, progressive acidification of the milk flowing in the compartments 22 is obtained.

This acidification can be carried out to the required value (a pH of about 4 to 4.5) so that the proteins coagulate and is not the result of any reagent being added to the milk, but is the sequel of the formation of acids corresponding to the anions of the milk by replacement of some of the cations by protone.

In the variant shown in FIGURE 3, the apparatus is similar to that described with reference to FIGURE 2, but the elementary cells comprise four compartments, i.e. an acid compartment 20 and a water compartment 24, similar to those in the previous example, but enclosing two central compartments 22a and 22b separated by an anionic membrane A.

Compartment 22a adjacent to the acid compartment contains the milk which undergoes electrodialysis. In the other compartment 22b adjacent to the water compartment there is a flow of an anion source consisting either of milk or a milk derivative, preferably a whey from a previous curdling operation.

When the apparatus is in operation, the membrane C defining the milk compartments 22a on the anode side stops the migration of the anions from the milk. Also, membrane A defining the milk compartment on the cathode side stops the cations from the milk. The acid present in the compartments 20 yields protons and the milk or whey in the compartments 22b yields the anions required for acidification, so that the initial content of mineral substances in the milk is not reduced in the final product.

As in the embodiment described with reference to FIGURE 2, acidification is controlled by varying the various factors involved.

The use of milk or whey from a previous operation as an anion source obviates the need for any introduction of foreign elements into the milk for acidification, since such elements are likely to affect the organoleptic properties of the milk.

What is claimed is:

1. A process for the production of cheese pastes and milk curds, comprising subjecting milk to an acidifying electrodialysis until the pH value thereof is lower than that which corresponds to the isoelectric point of the casein, and thereafter separating the thus-obtained curd from the whey.

2. The process claimed in claim 1, in which the electrodialysis is conducted so as to eleminate from the milk a sufficient proportion of the cations to produce the desired degree of acidification.

3. The process claimed in claim 1, in which the milk treated is inoculated with lactic ferments selected to confer organoleptic properties associated with these ferments.

4. The process claimed in claim 3, in which the inoculation is performed before the electrodialysis.

5. The process claimed in claim 3, in which the inoculation is performed after the electrodialysis.

6. A process for the production of cheese pastes and milk curds, comprising trea'ing a milk selected from the group consisting of whole milk, skimmed milk, high fat content milk, dry extracts, condensed milk and evaporated milk by an acidifying electrodialysis until its acidity reaches a pH value lower than that which corresponds to the isoelectric point of the casein, and then separating the thus-obtained curd from the whey.

7. The process claimed in claim 6, in which the electrodialysis is conducted so as to eliminate from the milk sufficient portion of the cations to produce the desired degree of acidification.

8. The process claimed in claim 6, in which the milk treated is inoculated with lactic ferments selected to confer organoleptic properties associated with these ferments.

9. The process claimed in claim 8, in which the inoculation is performed before the electrodialysis.

10. The process claimed in claim 8, in which the inoculation is performed after the electrodialysis.

11. The process claimed in claim 1, in which the electrodialysis is effected by means of selective cationic and anionic membranes.

12. The process claimed in claim 11, in which the milk is separated, on the anode side, by a cationic membrane from a space containing and acid intended to supply protons for the acidification.

13. The process claimed in claim 12, in which the milk is separated, on the cathode side, by a cationic membrane from a space containing a solution intended to remove cations.

14. The process claimed in claim 12, in which the milk is separated, on the cathod side, by an anionic membrane from a space containing a source of anions which is itself separated by a cationic membrane from a space containing a solution intended to remove cations.

15. The process claimed in claim 14, in which the source of anions is constituted by a material selected from the group consisting of milk and a milk derivative.

16. The process claimed in claim 15, in which said milk derivative is constituted by whey obtained from a previous milk curdling operation.

17. The process according to claim 2 in which the electrodialysis is conducted under conditions such that an excess of cations over anions is removed from the milk being treated.

18. The process according to claim 1 in which the separation is effected by centrifuging the electrodialyzed milk.

19. The process according to claim 7 in which the electrodialysis is conducted under conditions such that an excess of cations over anions is removed from the milk being treated.

20. The process according to claim 6 in which the separation is effected by centrifuging the electrodialyzed milk.

References Cited

UNITED STATES PATENTS

| | | | |
|---|---|---|---|
| 1,926,591 | 9/1933 | Loddesol | 204—1 |
| 2,631,100 | 3/1953 | Aten et al. | 99—57 |
| 2,921,005 | 1/1960 | Bodamer | 204—72 |
| 2,848,400 | 8/1958 | Meier et al. | 204—137 |
| 2,998,315 | 8/1961 | Peebles et al. | 99—54 |
| 3,325,389 | 6/1967 | Parsi et al. | 204—180 |
| 3,369,906 | 2/1968 | Chen | 99—77 |
| 3,423,208 | 1/1969 | Kuipers | 99—20 |

FOREIGN PATENTS 293,759   4/1965   Netherlands.

OTHER REFERENCES

Greatorex et al., "Advanced Study of Milk Decontamination by Electrodialysis," Office of Civil Defense Work Unit No. 3215B, Contract No. OCD-PS-64-281, SF 259 155, pp. 4, 5, 10, 11 and 12.

Ionics Bulletin L-2, 1963, Ionics Inc., Watertown, Mass.

JOHN H. MACK, Primary Examiner

A. C. PRESCOTT, Assistant Examiner

U.S. Cl. X.R.

99—54, 57, 116